US012247589B2

(12) United States Patent
Jin et al.

(10) Patent No.: US 12,247,589 B2
(45) Date of Patent: Mar. 11, 2025

(54) HYDRAULIC SYSTEM FOR ROTARY IMPLEMENT

(71) Applicant: XUZHOU XCMG EXCAVATOR MACHINERY CO., LTD., Jiangsu (CN)

(72) Inventors: Yuefeng Jin, Jiangsu (CN); Jiawen Geng, Jiangsu (CN); Quan Yuan, Jiangsu (CN); Jian Zhang, Jiangsu (CN); Yuzhong Dong, Jiangsu (CN); Dongyang Du, Jiangsu (CN); Yang Zhang, Jiangsu (CN); Benqiang Sun, Jiangsu (CN); Heng Miao, Jiangsu (CN); Jie Lu, Jiangsu (CN); Xinkui Zhang, Jiangsu (CN)

(73) Assignee: XUZHOU XCMG EXCAVATOR MACHINERY CO., LTD., Jiangsu (CN)

( * ) Notice: Subject to any disclaimer, the term of this patent is extended or adjusted under 35 U.S.C. 154(b) by 0 days.

(21) Appl. No.: 18/688,359

(22) PCT Filed: Jul. 26, 2022

(86) PCT No.: PCT/CN2022/107922
§ 371 (c)(1),
(2) Date: Mar. 1, 2024

(87) PCT Pub. No.: WO2023/035794
PCT Pub. Date: Mar. 16, 2023

(65) Prior Publication Data

US 2024/0360849 A1 Oct. 31, 2024

(30) Foreign Application Priority Data

Sep. 7, 2021 (CN) ........................ 202111041495.9

(51) Int. Cl.
*F15B 11/08* (2006.01)
*F15B 1/26* (2006.01)
(Continued)

(52) U.S. Cl.
CPC ................ *F15B 11/08* (2013.01); *F15B 1/26* (2013.01); *F15B 11/042* (2013.01);
(Continued)

(58) Field of Classification Search
CPC .................... F15B 11/042; F15B 11/08; F15B 2211/30535; F15B 2211/327;
(Continued)

(56) References Cited

U.S. PATENT DOCUMENTS 5,680,760 A * 10/1997 Lunzman .............. E02F 9/2228 60/494
6,076,488 A * 6/2000 Yamagishi ............. F01P 7/044 123/41.31
(Continued)

FOREIGN PATENT DOCUMENTS

CN 101451548 6/2009
CN 204628143 9/2015
(Continued)

OTHER PUBLICATIONS

"International Search Report (Form PCT/ISA/210) of PCT/CN2022/107922," mailed on Sep. 29, 2022, with English translation thereof, pp. 1-6.
(Continued)

*Primary Examiner* — Dustin T Nguyen
(74) *Attorney, Agent, or Firm* — JCIPRNET

(57) ABSTRACT

A hydraulic system for a rotary implement, including an oil tank, a main pump, a control valve, and a rotary motor is provided. The oil tank is connected to an oil suction port of the main pump; an oil outlet of the main pump is connected
(Continued)

to a P port of the control valve; a T port of the control valve is interconnected with the oil tank; and A and B ports of the control valve are connected to both ends of the rotary motor. The control valve includes a compensation valve connected to the P port and the T port, an electric proportional valve connected to the P port and the compensation valve, and an electromagnetic reversing valve connected to the compensation valve, the T port and the B port.

6 Claims, 1 Drawing Sheet

(51) Int. Cl.
*F15B 11/042* (2006.01)
*F15B 13/04* (2006.01)

(52) U.S. Cl.
CPC .. *F15B 13/0401* (2013.01); *F15B 2013/0412* (2013.01); *F15B 2211/30535* (2013.01); *F15B 2211/327* (2013.01); *F15B 2211/40507* (2013.01); *F15B 2211/40515* (2013.01); *F15B 2211/40569* (2013.01); *F15B 2211/413* (2013.01); *F15B 2211/41509* (2013.01); *F15B 2211/50518* (2013.01); *F15B 2211/50536* (2013.01); *F15B 2211/7058* (2013.01); *F15B 2211/75* (2013.01)

(58) Field of Classification Search
CPC .. F15B 2211/40507; F15B 2211/40515; F15B 2211/40569; F15B 2211/413; F15B 2211/41509; F15B 2211/50518; F15B 2211/50536; F15B 2211/7058; F15B 2211/75
See application file for complete search history.

(56) References Cited

U.S. PATENT DOCUMENTS

| | | | | |
|---|---|---|---|---|
| 6,182,448 | B1 * | 2/2001 | Ohkura | F16H 61/4148 60/494 |
| 11,168,713 | B2 * | 11/2021 | Bruck | F15B 13/0402 |
| 11,293,460 | B2 * | 4/2022 | Quan | F15B 13/0417 |
| 2012/0224983 | A1 * | 9/2012 | Yi | F15B 11/161 251/30.01 |

FOREIGN PATENT DOCUMENTS

| | | |
|---|---|---|
| CN | 107355438 | 11/2017 |
| CN | 110894840 | 3/2020 |
| CN | 212202669 | 12/2020 |
| CN | 113062888 | 7/2021 |
| CN | 113833701 | 12/2021 |
| JP | H08100805 | 4/1996 |
| JP | H10331802 | 12/1998 |
| JP | 2005325886 | 11/2005 |
| JP | 2007133646 | 5/2007 |
| JP | 2008308944 | 12/2008 |
| JP | 2009162350 | 7/2009 |
| JP | 2015145602 | 8/2015 |
| JP | 2016216008 | 12/2016 |

OTHER PUBLICATIONS

"Written Opinion of the International Searching Authority (Form PCT/ISA/237) of PCT/CN2022/107922," mailed on Sep. 29, 2022, pp. 1-5.

* cited by examiner

HYDRAULIC SYSTEM FOR ROTARY IMPLEMENT

CROSS-REFERENCE TO RELATED APPLICATION

This application is a 371 of international application of PCT application serial no. PCT/CN2022/107922, filed on Jul. 26, 2022, which claims the priority benefit of China application no. 202111041495.9, filed on Sep. 7, 2021. The entirety of the above-mentioned patent application is hereby incorporated by reference herein and made a part of this specification.

TECHNICAL FIELD

The present invention relates to a hydraulic system for a rotary implement, and belongs to the technical field of flow control for hydraulic systems of excavators.

DESCRIPTION OF RELATED ART

With the continuous innovation in excavator attachments, more and more attachments can be installed on excavators for diversified operations to implement multifunctional excavators, thereby taking the place of manual operation to increase the working efficiency. However, the attachments are all supplied with oil by pumps on the original systems of excavators at present, which reduces the action speed of the attachments, the bucket rods of excavator booms or the like and reduces the operation efficiency, when the attachments and the bucket rods of the excavator booms or the like are combined in action for operation.

As shown in FIG. 2, in the prior art, the action direction of a rotary motor 4 is controlled by a control valve 3-4 of a implement; a boom cylinder 5 stretches and retracts under the control of a boom control valve 3-2; a main pump 2 is simultaneously connected to the implement control valve 3-4 and the boom control valve 3-2; and hydraulic oil output by the main pump 2 is simultaneously supplied to the implement motor 4 and the boom cylinder 5. The rotary motor 4 and the boom cylinder 5 share the same main pump 2, and when the rotary motor 4 regulates the stroke of the boom cylinder 5 during rotation, a rapid drop of to the rotation speed of the rotary motor 4 will be caused, affecting the operation efficiency.

BRIEF SUMMARY OF THE INVENTION

The present invention is intended to solve the technical problem and overcome the defects in the prior art, and provides a hydraulic system for a rotary implement, by which the implement speed of a rotary motor is individually controlled and is not affected by the actions of a bucket rod of a boom, or the like.

To achieve the above object, the present invention provides a hydraulic system for a rotary implement, including an oil tank, a main pump, a control valve, and a rotary motor, wherein the oil tank is connected to an oil suction port of the main pump; an oil outlet of the main pump is connected to a P port of the control valve; a T port of the control valve is interconnected with the oil tank; and A and B ports of the control valve are connected to both ends of the rotary motor.

Preferably, the control valve includes a compensation valve, an electric proportional valve and an electromagnetic reversing valve; the P port is connected to a first oil port of the electric proportional valve, as well as third and fifth oil ports of the compensation valve; a second oil port of the electric proportional valve is connected to a first oil port of the compensation valve; a second oil outlet of the compensation valve is connected to a third oil port of the electromagnetic reversing valve as well as the T port; a fourth oil outlet of the compensation valve is connected to the T port; the fourth oil port of the electromagnetic reversing valve is connected to the T port; and the second oil port of the electromagnetic reversing valve is connected to the B port.

Preferably, the control valve includes an overflow valve, the P port is connected to a first oil port of the overflow valve, and a second oil port of the overflow valve is connected to the T port.

Preferably, the control valve includes a first port overflow valve; the fourth oil port of the electromagnetic reversing valve is connected to a first oil port of the first port overflow valve; a second oil port of the first port overflow valve is connected to the A port, as well as a first oil port of the electromagnetic reversing valve.

Preferably, the control valve includes a second port overflow valve; the second oil port of the electromagnetic reversing valve is connected to a first oil port of the second port overflow valve; a second oil port of the second port overflow valve is connected to the T port; and the first oil port of the second port overflow valve is interconnected with the B port.

Preferably, the electromagnetic reversing valve is a three-position four-way electromagnetic reversing valve; at a left position of the three-position four-way electromagnetic reversing valve, a first oil port is interconnected with the third oil port, and the second oil port is interconnected with the fourth oil port; and at a right position of the three-position four-way electromagnetic reversing valve, the first oil port is interconnected with the fourth oil port, and the second oil port is interconnected with the third oil port.

Preferably, a throttle valve is included, wherein the second oil port of the compensation valve is connected to the T port via the throttle valve.

The beneficial effects achieved by the present invention are as follows.

In the present invention, the rotary motor is individually controlled, the electromagnetic reversing valve is switched between the left position and the right position to control the forward and reverse rotation of the rotary motor, and the electric proportional valve and the compensation valve are used to turn on or off the oil circuit of the rotary motor, such that the rotation speed of the rotary motor is not affected when other actions of the bucket rod of the boom or the like are done during the rotation of the rotary motor, thereby increasing the overall working efficiency.

In the present invention, when the rotary motor is overloaded and fails to rotate, the hydraulic oil output by the main pump is relieved to the hydraulic oil tank via the overflow valve 37; when the rotary motor rotates clockwise, if the electromagnetic reversing valve is deenergized, the electromagnetic reversing valve works at a neutral position, an oil circuit for the main pump and the rotary motor is disconnected, an oil circuit for the hydraulic oil tank and the rotary motor is disconnected, the rotary motor continues rotating clockwise under the action of inertia, the pressure decreases in a pipeline from A to C, and the pressure rises in a pipeline from D to B. At this point, the first port overflow valve sucks oil from the hydraulic oil tank to compensate for the pipeline line from A to C, thereby preventing evacuation; and the second port overflow valve discharges high-pressure oil in the pipeline from D to B to the hydraulic oil tank for relief, thereby avoiding system overload.

When the rotary motor rotates counterclockwise, if the electromagnetic reversing valve is deenergized, the electromagnetic reversing valve works at the neutral position, the oil circuit for the main pump and the rotary motor is disconnected, the oil circuit for the hydraulic oil tank and the rotary motor is disconnected, the rotary motor continues rotating counterclockwise under the action of inertia, the pressure rises in the pipeline from A to C, and the pressure decreases in the pipeline from D to B. At this point, the first port overflow valve discharges the high-pressure oil in the pipeline from A to C to the hydraulic oil tank for relief, thereby avoiding system overload; and the second port overflow valve sucks oil from the hydraulic oil tank to compensate for the pipeline line from D to B, thereby preventing evacuation. In this way, all the hydraulic oil in all the oil circuit is prevented from flowing into the oil tank, which guarantees the smooth operation of the entire oil circuit.

Figure 1:
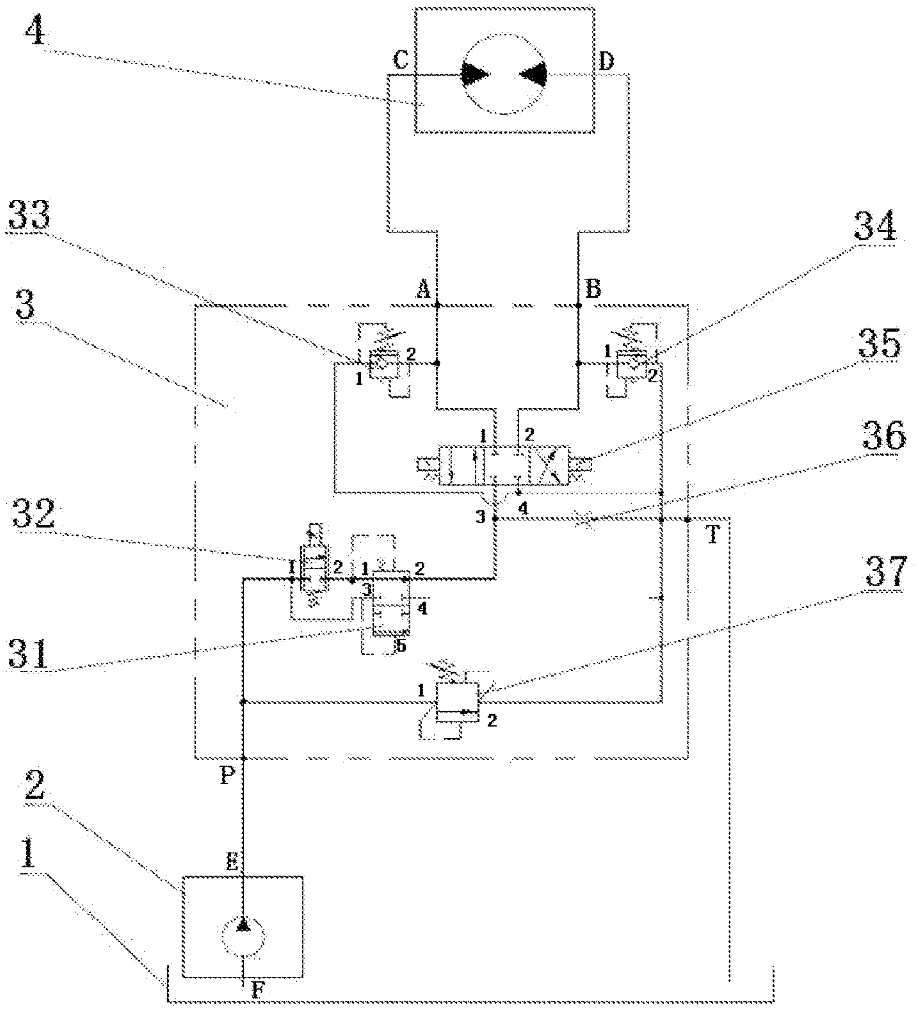
FIG. 1 is a diagram showing an oil circuit according to the present invention.
Figure 2:
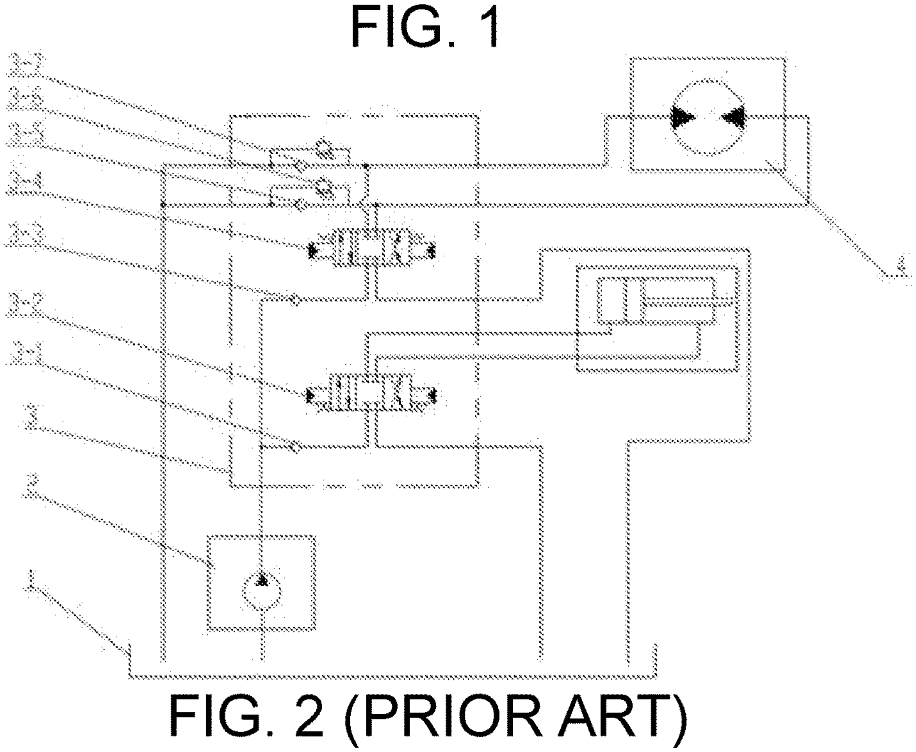
FIG. 2 (PRIOR ART)
FIG. 2 is a diagram showing an oil circuit of a boom cylinder of a rotary motor in the prior art.

Reference signs have the following meanings: 1, oil tank; 2, main pump; 3, control valve; 4, rotary motor; 31, compensation valve; 32, electric proportional valve; 33, first port overflow valve; 34, second port overflow valve; 35, electromagnetic reversing valve; 36, throttle valve; 37, overflow valve; 3-1, first one-way valve; 3-2, boom reversing valve; 3-3, second one-way valve; 3-4, reversing valve of rotary motor; 3-5, first oil compensation valve; 3-6, first overflow valve; 3-7, second one-way valve; 3-8, second overflow valve.

DETAILED DESCRIPTION OF THE INVENTION

The embodiments below are merely for the purpose of more clearly illustrating the technical solutions of the present invention, and are not intended to limit the protection scope of the present invention.

It should be noted that all directional indications (such as, up, down, left, right, front, and back) in the embodiments of the present invention only are used to explain a relative positional relationship, a motion condition and the like between various components under a specific posture. If the specific posture changes, the directional indications will change accordingly.

In addition, the descriptions such as "first" and "second" involved in the embodiments of the present invention are merely for a descriptive purpose, and shall not be construed as indicating or implying their relative importance or implicitly indicating the number of technical features indicated. As such, features defined by "first" and "second" can explicitly or implicitly include at least one of said features. In addition, the technical solutions of various embodiments can be mutually combined, which must be based on the fact that it is implementable for those skilled in the art. When the technical solutions are in conflict during the combining or the combination is not achievable, it should be considered that such a combination does not exist and is not within the protection scope claimed by the invention.

The novel hydraulic system and control valve for a rotary implement of an excavator mainly include an oil tank 1, a main pump 2, a control valve 3, a rotary motor 4, and a boom cylinder 5. The control valve 3 includes a compensation valve 31, an electric proportional valve 32, a first port overflow valve 33, a second port overflow valve 34, an electromagnetic reversing valve 35, a throttle valve 36, and an overflow valve 37.

An oil suction port F of the main pump 2 is connected to the oil tank 1; an oil outlet E of the main pump 2 is connected to a P port of the control valve 3; the P port is connected to a first oil port of the overflow valve 37; a second oil port of the overflow valve 37 is connected to a T port, which is connected to the hydraulic oil tank 1; the P port is connected to a first oil port of the electric proportional valve 32; the P port of the control valve 3 is connected to a third oil port of the compensation valve 31, and is connected to a fifth oil port of the compensation valve 31; a second oil port of the electric proportional valve 32 is connected to a first oil port of the compensation valve 31; a second oil port of the electric proportional valve 32 is connected to the first oil port of the compensation valve 31; a second oil outlet of the compensation valve 31 is connected to an oil inlet of the throttle valve 36; a second oil port of the compensation valve 31 is connected to a third oil port of the electromagnetic reversing valve 35; an oil outlet of the throttle valve 36 is connected to the T port; an oil outlet of the compensation valve 31 is connected to the T port; the fourth oil port of the electromagnetic reversing valve 35 is connected to the T port, and is connected to a first oil port of the first port overflow valve 33; a second oil port of the first port overflow valve 33 is connected to an A port, and is simultaneously connected to the first oil port of the electromagnetic reversing valve 35; a second oil port of the electromagnetic reversing valve is connected to a B port, and is connected to a first oil port of the second port overflow valve 34; a second oil port of the second port overflow valve 34 is connected to the T port; a first oil port of the second port overflow valve 34 is interconnected with a B port; the A port is connected to a C port of the rotary motor 4; and the B port is connected to a D port of the rotary motor 4.

In the present invention configured in such a way, the working principle is as follows.

After an excavator is started up, an engine drives the main pump 2 to work; the main pump 2 outputs hydraulic oil, which enters the P port of the control valve 3; and when the rotary motor 4 is not needed to work, an inner oil circuit in the electric proportional valve 32 is disconnected when the electric proportional valve 32 is deenergized, and the hydraulic oil output by the main pump 2 is led into the hydraulic oil tank 1 via the compensation valve 31.

When the rotary motor 4 is needed to work, a left or right electromagnet of the electromagnetic reversing valve 35 and the electric proportional valve 32 are energized; the current of the electric proportional valve 32 can be regulated according to a speed requirement to control the opening area of the internal oil circuit of the electric proportional valve 32; and the main pump 2 outputs hydraulic oil, which passes through the internal oil circuit of the electric proportional valve 32, an internal oil circuit of the compensation valve 31 and then an internal oil circuit of the electric reversing valve 35 to enter the rotary motor 4, which is driven to rotate.

When the left electromagnet of the electromagnetic reversing valve 35 is energized, the electromagnetic reversing valve 35 works at a left position; the main pump 2 outputs the hydraulic oil, which passes through the left position of the electromagnetic reversing valve 35 and the A and C ports to enter the rotary motor 4, which then rotates clockwise; and when the right electromagnet of the electromagnetic reversing valve 35 is energized, and the electromagnetic reversing valve 35 works at a right position; and the main pump 2 outputs the hydraulic oil, which passes through the right position of the electromagnetic reversing valve 35 and the B and D ports to enter the rotary motor 4, which then rotates counterclockwise.

When the rotary motor 4 is overloaded and fails to rotate, the hydraulic oil output by the main pump 2 is relieved to the hydraulic oil tank 1 via the overflow valve 37; and when the rotary motor 4 rotates clockwise, if the electromagnetic reversing valve 35 is deenergized, the electromagnetic reversing valve 35 works at a neutral position, an oil circuit for the main pump 2 and the rotary motor 4 is disconnected, an oil circuit for the hydraulic oil tank 1 and the rotary motor 4 is disconnected, the rotary motor 4 continues rotating clockwise under the action of inertia, the pressure decreases in a pipeline from A to C. and the pressure rises in a pipeline from D to B. At this point, the first port overflow valve 33 sucks oil from the hydraulic oil tank 1 to compensate for the pipeline line from A to C, thereby preventing evacuation; and the second port overflow valve 34 discharges high-pressure oil in the pipeline from D to B to the hydraulic oil tank 1 for relief, thereby avoiding system overload.

When the rotary motor 4 rotates counterclockwise, if the electromagnetic reversing valve 35 is deenergized, the electromagnetic reversing valve 35 works at the neutral position, the oil circuit for the main pump 2 and the rotary motor 4 is disconnected, the oil circuit for the hydraulic oil tank 1 and the rotary motor 4 is disconnected, the rotary motor 4 continues rotating counterclockwise under the action of inertia, the pressure rises in the pipeline from A to C. and the pressure decreases in the pipeline from D to B. At this point, the first port overflow valve 33 discharges the high-pressure oil in the pipeline from A to C to the hydraulic oil tank 1 for relief, thereby avoiding system overload; and the second port overflow valve 34 sucks oil from the hydraulic oil tank 1 to compensate for the pipeline line from D to B, thereby preventing evacuation.

According to the present invention, the control valve is added to regulate the flow entering the motor of the implement to allow individual control of the motor speed of the implement. The implement speed of the rotary motor is not affected by other actions of the bucket rod of the boom or the like, and the rotation speed can be regulated in real time as required by the working condition. The present invention has a simple and reliable structure and good universality, and is applicable to industrialized popularization and application.

There are many models available for the above components such as the hydraulic oil tank 1, the main pump 2, the rotary motor 4, the boom cylinder 5, the compensation valve 31, the electric proportional valve 32, the first port overflow valve 33, the second port overflow valve 34, the electromagnetic reversing valve 35, the throttle valve 36, and the overflow valve 37. Those skilled in the art can choose appropriate models according to actual needs, which will not be illustrated one by one in this embodiment.

The description above only provides preferred embodiments of the present invention. For those of ordinary skills in the art, it should be noted that various improvements and transformations can also be made without departing from the technical principle of the present invention, and these improvements and transformations shall be construed as falling within the protection scope of the present invention.

What is claimed is:

1. A hydraulic system for a rotary implement, comprising an oil tank, a main pump, a control valve, and a rotary motor, wherein the oil tank is connected to an oil suction port of the main pump; an oil outlet of the main pump is connected to a P port of the control valve; a T port of the control valve is interconnected with the oil tank; and A and B ports of the control valve are connected to both ends of the rotary motor, wherein the control valve comprises a compensation valve, an electric proportional valve and an electromagnetic reversing valve; the P port is connected to a first oil port of the electric proportional valve, as well as third and fifth oil ports of the compensation valve; a second oil port of the electric proportional valve is connected to a first oil port of the compensation valve; a second oil outlet of the compensation valve is connected to a third oil port of the electromagnetic reversing valve as well as the T port; a fourth oil outlet of the compensation valve is connected to the T port; the fourth oil port of the electromagnetic reversing valve is connected to the T port; and the second oil port of the electromagnetic reversing valve is connected to the B port.

2. The hydraulic system for a rotary implement according to claim 1, wherein the control valve comprises an overflow valve, the P port is connected to a first oil port of the overflow valve, and a second oil port of the overflow valve is connected to the T port.

3. The hydraulic system for a rotary implement according to claim 1, wherein the control valve comprises a first port overflow valve; the fourth oil port of the electromagnetic reversing valve is connected to a first oil port of the first port overflow valve; a second oil port of the first port overflow valve is connected to the A port, as well as a first oil port of the electromagnetic reversing valve.

4. The hydraulic system for a rotary implement according to claim 1, wherein the control valve comprises a second port overflow valve; the second oil port of the electromagnetic reversing valve is connected to a first oil port of the second port overflow valve; a second oil port of the second port overflow valve is connected to the T port; and the first oil port of the second port overflow valve is interconnected with the B port.

5. The hydraulic system for a rotary implement according to claim 1, wherein the electromagnetic reversing valve is a three-position four-way electromagnetic reversing valve; at a left position of the three-position four-way electromagnetic reversing valve, the first oil port is interconnected with the third oil port, and the second oil port is interconnected with the fourth oil port; and at a right position of the three-position four-way electromagnetic reversing valve, the first oil port is interconnected with the fourth oil port, and the second oil port is interconnected with the third oil port.

6. The hydraulic system for a rotary implement according to claim 1, further comprising:

a throttle valve, wherein the second oil port of the compensation valve is connected to the T port via the throttle valve.

* * * * *